United States Patent
Choe

(10) Patent No.: US 9,323,378 B2
(45) Date of Patent: Apr. 26, 2016

(54) METHOD AND APPARATUS OF ELECTRONIC PAPER COMPRISING A USER INTERFACE

(75) Inventor: Sung Yul Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 527 days.

(21) Appl. No.: 12/732,096

(22) Filed: Mar. 25, 2010

(65) Prior Publication Data

US 2011/0047460 A1  Feb. 24, 2011

(30) Foreign Application Priority Data

Aug. 19, 2009 (KR) .................. 10-2009-0076555

(51) Int. Cl.
G06F 3/041 (2006.01)
G06F 3/0488 (2013.01)

(52) U.S. Cl.
CPC .......... *G06F 3/0416* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 5,917,491 A | * | 6/1999 | Bauersfeld | 715/810 |
| 6,243,071 B1 | * | 6/2001 | Shwarts et al. | 715/823 |
| 2002/0049637 A1 | * | 4/2002 | Harman et al. | 705/26 |
| 2003/0227441 A1 | | 12/2003 | Hioki et al. | |
| 2004/0008191 A1 | * | 1/2004 | Poupyrev et al. | 345/184 |
| 2004/0236774 A1 | * | 11/2004 | Baird et al. | 707/100 |
| 2006/0239248 A1 | * | 10/2006 | Hawk et al. | 370/352 |
| 2006/0274036 A1 | * | 12/2006 | Hioki et al. | 345/156 |
| 2007/0242033 A1 | | 10/2007 | Cradick et al. | |
| 2007/0247422 A1 | * | 10/2007 | Vertegaal et al. | 345/156 |
| 2007/0285341 A1 | * | 12/2007 | Manning | 345/1.3 |
| 2008/0094371 A1 | | 4/2008 | Forstall et al. | |
| 2008/0163053 A1 | * | 7/2008 | Hwang et al. | 715/702 |
| 2008/0303782 A1 | * | 12/2008 | Grant et al. | 345/156 |
| 2008/0316581 A1 | | 12/2008 | Moriya et al. | |
| 2010/0011291 A1 | * | 1/2010 | Nurmi | 715/702 |

FOREIGN PATENT DOCUMENTS

| | | |
|---|---|---|
| DE | 10 2007 052 008 A1 | 4/2009 |
| JP | 11-134087 | 5/1999 |
| JP | 2004-46792 | 2/2004 |
| JP | 2004-258477 | 9/2004 |
| JP | 2004-318123 | 11/2004 |
| JP | 2005-266226 | 9/2005 |
| JP | 2007-141029 | 6/2007 |
| JP | 2008-027453 | 2/2008 |

(Continued)

OTHER PUBLICATIONS

Holman, D. et al., "Organice User Interfaces: Designing Computers in Any Way, Shape, or Form", Jun. 2008, ACM, vol. 51 Issue 6, pp. 48-55.*

(Continued)

*Primary Examiner* — Stella E Higgs
(74) *Attorney, Agent, or Firm* — NSIP Law

(57) ABSTRACT

An e-paper apparatus comprising a user interface and a method for an e-paper are provided. The e-paper apparatus and method are provided based on a user manipulation of digital contents that is similar to a user handling a paper or a book. The e-paper apparatus and method may provide a user interface for an e-paper that is easily and tangibly used by a user.

17 Claims, 16 Drawing Sheets

(56) References Cited

FOREIGN PATENT DOCUMENTS

| KR | 10-2002-0063381 | 8/2002 |
|---|---|---|
| KR | 10-2003-0078783 | 10/2003 |
| KR | 10-2004-0052219 | 6/2004 |
| WO | WO 2009/012820 A1 | 1/2009 |

OTHER PUBLICATIONS

Lee, J. et al., "Foldable Interactive Displays", Oct. 19-22, 2008, UIST, pp. 287-290.*

Shen, E. et al., "Double-side multi-touch input for mobile devices", Apr. 4-9, 2009, CHI, pp. 4339-4344.*

Gallant, D. et al.; "Towards More Paper-like Input: Flexible Input Devices for Foldable Interaction Styles"; Oct. 2008, ACM; UIST '08; pp. 283-286.*

Watanabe, J. et al.; "Bookisheet: Bendable Device for Browsing Content Using the Metaphor of Leafing Through the Pages"; Sep. 2008; ACM; UbiComp '08; pp. 360-369.*

Japanese Office Action issued Jan. 28, 2014 in counterpart Japanese Patent Application No. 2010-071386 (3 pages, in Japanese).

European Search Report issued May 2, 2014 in counterpart European Patent Application No. 10161305.7 (9 pages).

Korean Office Action issued on Jun. 18, 2015 in counterpart Korean Application No. 10-2009-0076555 (9 pages, with English translation).

Japanese Office Action issued on Jan. 19, 2016 in counterpart Japanese Patent Application No. 2010-71386 (12 pages in English; 22 pages in Japanese).

European Office Action issued on Feb. 11, 2016 in counterpart European Patent Application No. 10 161 305.7 (5 pages in English).

* cited by examiner

METHOD AND APPARATUS OF ELECTRONIC PAPER COMPRISING A USER INTERFACE

CROSS-REFERENCE TO RELATED APPLICATION

This application claims the benefit under 35 U.S.C. §119(a) of Korean Patent Application No. 10-2009-0076555, filed on Aug. 19, 2009, in the Korean Intellectual Property Office, the entire disclosure of which is incorporated herein by reference for all purposes.

BACKGROUND

1. Field

The following description relates to a user interface, and more particularly, to a user interface for electronic paper (e-paper).

2. Description of Related Art

An e-paper or an e-book is commonly utilized to use digital contents. E-paper is a portable, reusable storage and display medium that looks like paper but can be repeatedly written on refreshed by electronic means. E-paper may be used for various applications, for example, e-books, electronic newspapers, portable signs, foldable, rollable displays, and the like. Information to be displayed may be downloaded through a connection to a computer or a cell phone, or created with mechanical tools such as an electronic "pencil". There are a number of different technologies currently being developed in relation to e-paper.

The e-paper may provide a clear image while at the same time using up only a small amount of power. Generally, a user interface of the e-paper or the e-book may include a user interface that is related to a notebook or a tablet PC. Accordingly, the user may input a desired command by using a keypad. However, as the use of e-paper increases, other methods of inputting information are becoming desirable.

SUMMARY

In one general aspect, provided is an e-paper apparatus including a user interface, the apparatus including a touch interface for receiving input from a user, a user manipulation sensor to sense a manipulation by a user on the touch interface, and an e-paper controller to control the e-paper to perform a function corresponding to the manipulation of the user, wherein the manipulation of the user corresponds to a method of handling a paper or a book.

The user manipulation sensor may include a touch sensing unit to sense a touch event with respect to the touch interface, a pressure sensing unit to sense a pressure applied to the e-paper, and a gravity-directional sensing unit to sense a change in gravity direction of the e-paper.

The touch sensing unit may sense a touch event with respect to a front side of the e-paper and a touch event with respect to a back side of the e-paper.

The manipulation by the user may include the user turning the e-paper over, and, in response, the e-paper controller may control the e-paper to change a page displayed on the e-paper.

The manipulation by the user may include the user bending the e-paper with both hands and leaving the e-paper bent, and, in response, the e-paper controller may control the e-paper to display a page selection menu.

The e-paper may display a contents list, the manipulation by the user may include the user touching at least one of a front side and back side of the e-paper with a finger to select one contents from among the contents list, and dragging the finger touching the at least one of the front side and back side of the e-paper, and, in response, the e-paper controller may control the e-paper to store or delete the selected contents depending on a drag direction of the finger touching the at least one of the front side and back side of the e-paper.

The manipulation by the user may include bending a corner of the e-paper, and, in response, the e-paper controller may control the e-paper to set a bookmark on a page displayed on the e-paper.

The manipulation by the user may include bending a corner of the e-paper, and, in response, the e-paper controller may control the e-paper to move to a page where a bookmark is set.

The manipulation by the user may include touching at least one of a front side and a back side of a corner of the e-paper, over the course of a preset time threshold, and, in response, the e-paper controller may control the e-paper to provide a bookmark setting menu.

The manipulation by the user may include touching a bookmark displayed on the e-paper, and, in response, the e-paper controller may control the e-paper to provide a bookmark delete menu.

The manipulation by the user may include dragging a bookmark displayed on the e-paper, and, in response, the e-paper controller may control the e-paper to provide a bookmark list.

The manipulation by the user may include folding the e-paper, and, in response, the e-paper controller may control the e-paper to provide a memory area.

The manipulation by the user may include touching both faces of a folded e-paper and dragging the finger, and, in response, the e-paper controller may control the e-paper to delete a memo displayed on the e-paper.

In another aspect, provided is a method of controlling an e-paper based on user manipulation, the method including providing a user interface for receiving input from a user, sensing a manipulation by a user on the user interface, and controlling, by a processor, the e-paper to perform a function corresponding to the manipulation by the user.

The manipulation by the user may include turning the e-paper over, and, in response, the processor may control the e-paper to change a page displayed on the e-paper.

The manipulation by the user may include turning the e-paper over, and, in response, the processor may control the e-paper to change contents on the e-paper.

The manipulation by the user may include bending the e-paper with both hands, and, in response, the processor may control the e-paper to display a page selection menu.

The manipulation by the user may include touching at least one of a front side and back side of a corner of the e-paper over the course of a preset time threshold, and, in response, the processor may control the e-paper to provide a bookmark setting menu.

In another aspect, provided is a method of providing a user interface, including displaying a contents list on an e-paper, sensing a first manipulation by a user including touching a front side and a back side of the e-paper to select one contents from among the contents list, sensing a second manipulation by a user including dragging a finger touching at least one of the front side and the back side of the e-paper, and controlling the e-paper to store or delete the selected contents according to a drag direction of the finger touching the at least one of the front side and back side of the e-paper.

Other features and aspects may be apparent from the following description, the drawings, and the claims.

Figure 1:
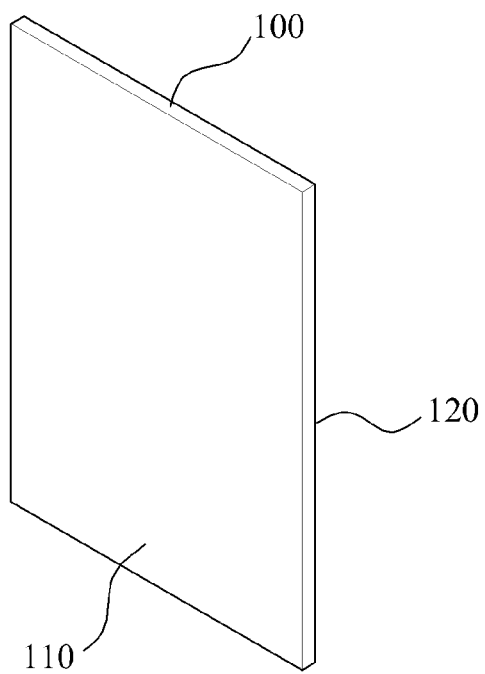
FIG. 1 is a diagram illustrating an example of an e-paper.

Throughout the drawings and the detailed description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of e-paper. The example e-paper 100 may display contents through a front side 110 or a back side 120. The e-paper 100 may include a flexible display capable of being folded or bent. In some embodiments, the e-paper may include a rigid display. The e-paper 100 may include a user interface (not illustrated).

Figure 2:
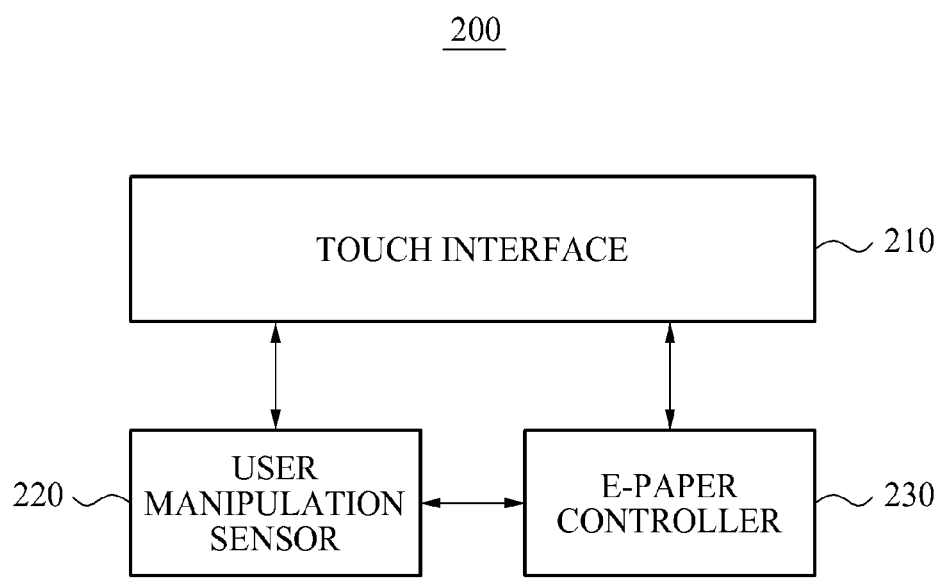
FIG. 2 is a diagram illustrating an example of a user interface.

FIG. 2 illustrates an example of a user interface. Referring to FIG. 2, the example user interface 200 includes a touch interface 210, a user manipulation sensor 220, and an e-paper controller 230.

The touch interface 210 may provide a user interface that supports a user input by a touch of a user finger, a stylus, and the like. Also, the touch interface 210 may display contents to a user. Referring to FIG. 1 and FIG. 2, the touch interface 210 may be equipped on the front side 110 and/or the back side 120 of the e-paper 100. Accordingly, the user may touch both the front side 110 and/or the back side 120 of the e-paper, for example, by using a thumb, an index finger, and a stylus, to manipulate the e-paper 100.

A user manipulation sensor 220 may sense the manipulation by the user on the e-paper. For example, the user manipulation sensor 220 may sense a touch event with respect to the touch interface 210 and may sense a direction of a drag with respect to the touch event. The touch event may include, for example, a condition where a finger of the user touches the touch interface 210. In this example, the drag may be similar in concept to a drag of a mouse in a personal computer (PC) environment. Accordingly, the direction of the drag corresponding to the touch event may indicate a direction that the finger of the user moves, while the touch event is maintained. For example, the touch event may simultaneously occur on both the front side 110 and the back side 120 of the e-paper 100. In the example where the e-paper 100 is flexible, the user manipulation sensor 220 may sense a location where the e-paper 100 is being bent and a degree of bending.

The e-paper controller 230 may control the e-paper 100 to perform one or more functions in response to the manipulation by the user. For example, the manipulation of the user may be similar to handling the paper or the book. Accordingly, a user may manipulate the e-paper, for example, to scroll down the page, to highlight text, to enlarge text, to turn the page, and the like.

Figure 3:
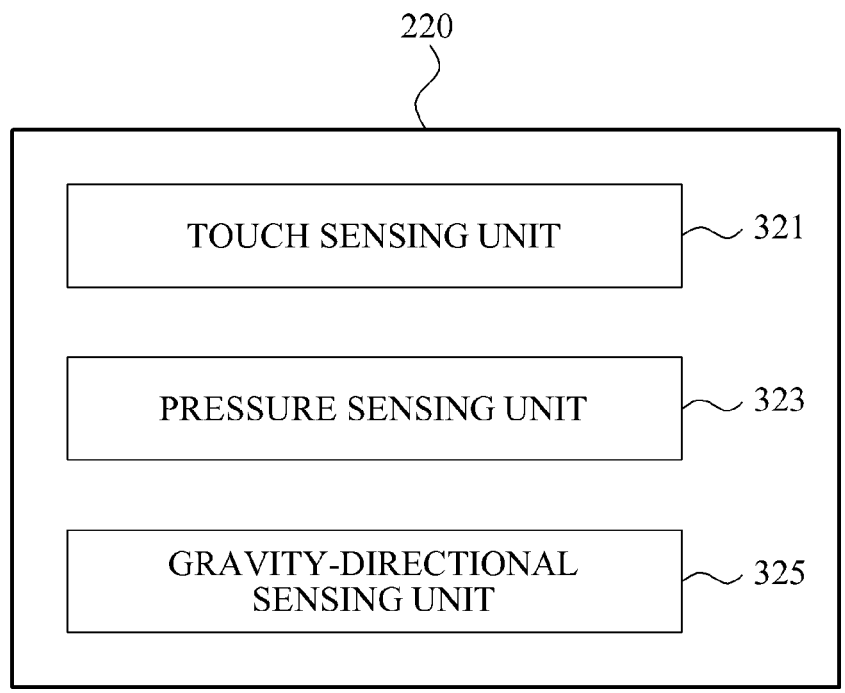
FIG. 3 is a diagram illustrating an example of a user manipulation sensor that may be included in the user interface of FIG. 2.

FIG. 3 illustrates an example of a user manipulation sensor that may be included in the user interface of FIG. 2. Referring to FIG. 3, the example user manipulation sensor 220 may include a touch sensing unit 321, a pressure sensing unit 323, and a gravity-directional sensing unit 325.

Referring to FIG. 1 and FIG. 3, the touch sensing unit 321 senses a touch event of the e-paper 100. For example, the touch sensing unit 321 may sense a touch event with respect to the front side 110 of the e-paper 100 and may sense a touch event with respect to the back side 120 of the e-paper 100.

The pressure sensing unit 323 may sense a pressure applied to the e-paper 100. For example, the pressure sensing unit 323 may sense the amount of pressure applied by a user's finger, a stylus, and the like.

The gravity-directional sensing unit 325 may sense a change in a gravity direction of the e-paper 100. For example, the gravity-directional sensing unit 325 may include at least one of a gyro sensor, a geomagnetic sensor, an acceleration sensor, and the like.

The touch sensing unit 321, the pressure sensing unit 323, and the gravity-directional sensing unit 325 may be embodied in various configurations. The touch sensing unit 321, the pressure sensing unit 323, and the gravity-directional sensing unit 325 are examples of components that may be included in the user manipulation sensor 220. Other types of sensors may be used in the user manipulation sensor 220. That is, the user manipulation sensor 220 may include various other components to sense the manipulation of the user.

Hereinafter, examples of the user interface are described with reference to FIGS. 1 through 3.

Figure 4:
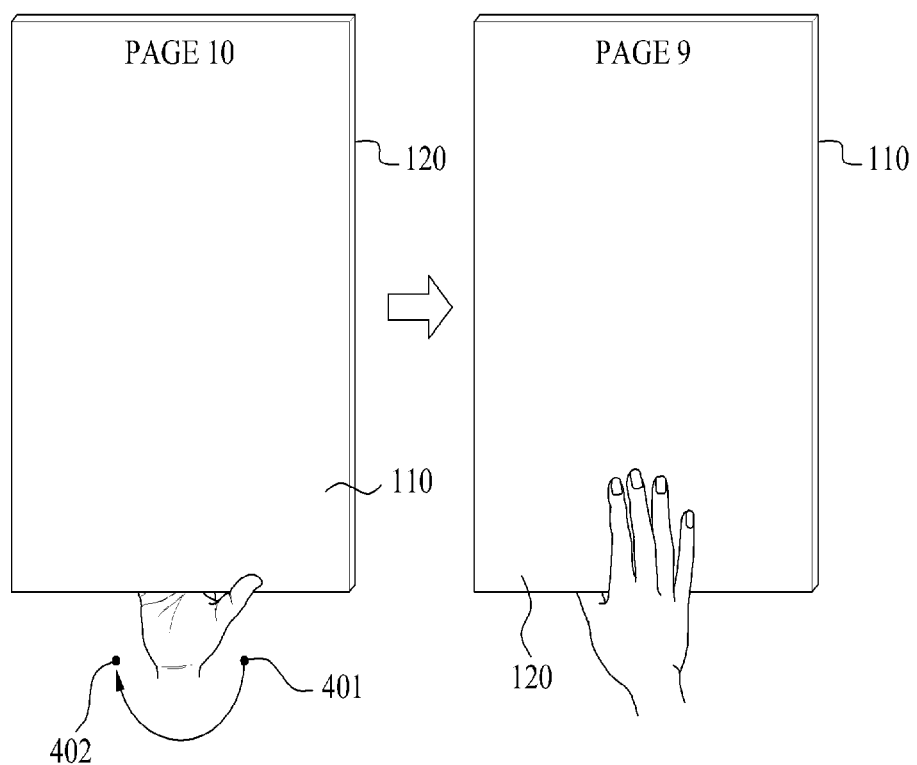
FIG. 4 is a diagram illustrating an example operation of turning the e-paper over.

FIG. 4 illustrates an example operation of manipulating an e-paper. In the example shown in FIG. 4, a user manipulates the e-paper by turning the e-paper over to view the back side 120 while viewing the front side 110 of the e-paper. That is, the user may turn the e-paper over from direction 402 to direction 401. For example, the user manipulation sensor 220 may sense the manipulation of turning the e-paper over. The e-paper controller 230 may control the e-paper to change a page displayed on the e-paper in response to the manipulation of turning the e-paper over.

In the example shown in FIG. 4, the page displayed on the e-paper is changed from page 10 to page 9. That is, the user turns the e-paper over from the direction 401 to the direction 402, and thus, the user is able to view a previous page with respect to a currently displayed page. Also, the e-paper controller 230 may control the e-paper to change the page from page 10 to page 11 in response to the manipulation by the user of turning the e-paper over from direction 401 to direction 402.

Figure 5:
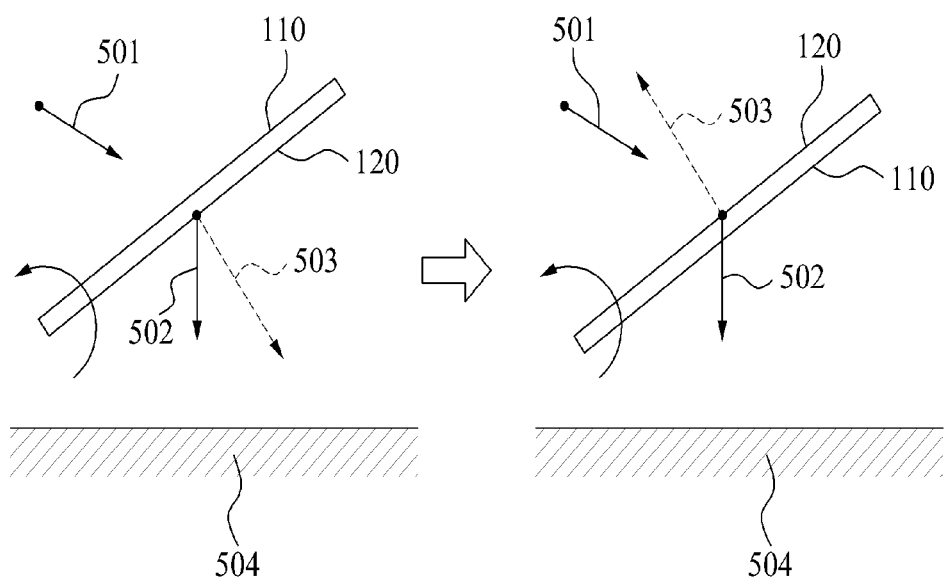
FIG. 5 is a diagram illustrating a side-perspective view of the example turning operation shown in FIG. 4.

FIG. 5 illustrates a side-perspective view of the example shown in FIG. 4. In the example shown in FIG. 5, the front side 110 of the e-paper faces a gaze 501 of the user, at first. In this example, the back side 120 of the e-paper faces the ground 504, at first. Then, the user turns the e-paper over, and thus, the front side 110 of the e-paper now faces the ground 504.

In FIG. 5, the user manipulation sensor 220 senses a gravity direction 502 and a change of a direction 503 that the back side 120 of the e-paper is facing, and thus, senses the manipulation of the user.

Figure 6:
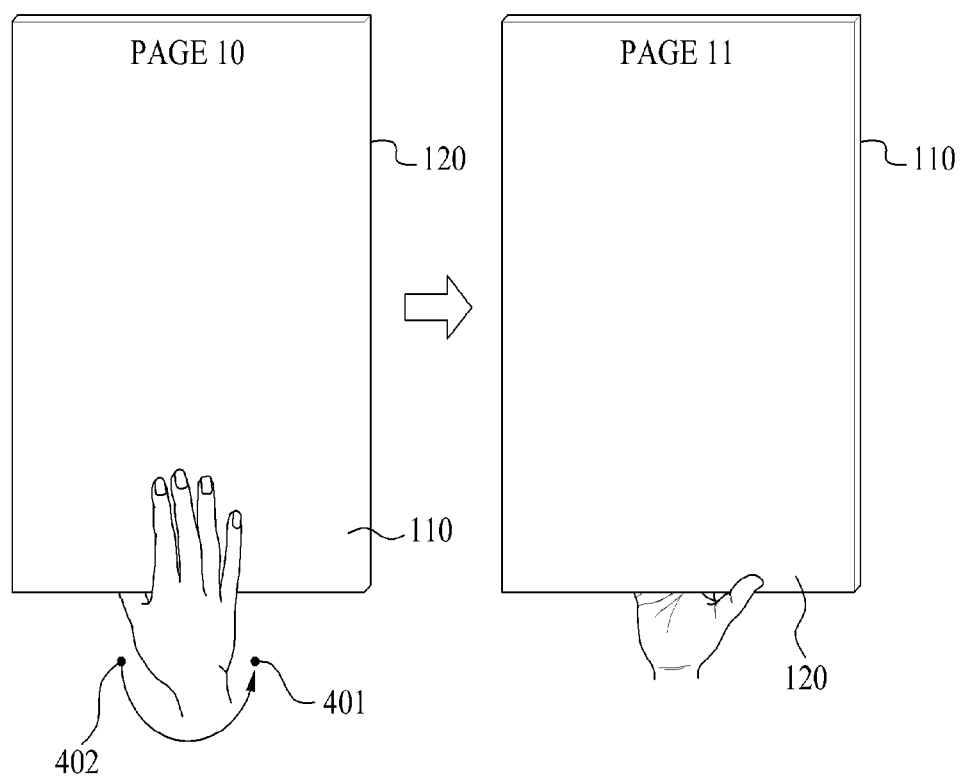
FIG. 6 is a diagram illustrating another example operation of turning the e-paper over.

FIG. 6 illustrates another example operation of manipulating e-paper. In the example shown in FIG. 6, the user manipulates the e-paper by turning the e-paper over from direction 402 to direction 401. In this example, a page displayed on the e-paper is changed from a page 10 to a page 11. That is, the user turns the e-paper over from direction 402 to direction 401, and thus, views a next page with respect to the currently displayed page.

Figure 7:
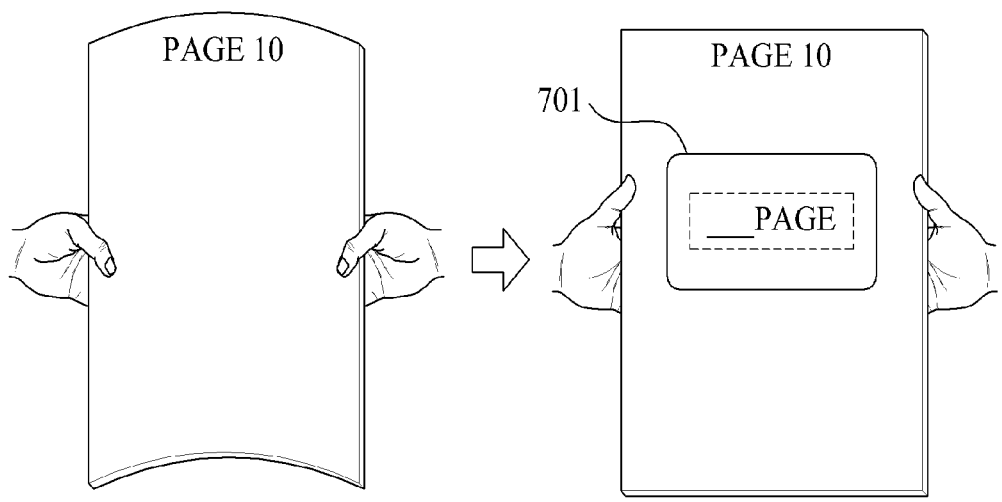
FIG. 7 is a diagram illustrating an example operation of bending the e-paper.

FIG. 7 illustrates another example operation of manipulating e-paper. In the example shown in FIG. 7, the user manipulates the e-paper by bending the e-paper as if turning pages of a book, and leaving the e-paper bent. In this example, the user manipulation sensor 220 may sense the manipulation of bending the e-paper by the user's hands and leaving the e-paper bent. For example, the user manipulation sensor 220 may sense that both sides of the e-paper are touched by the user and the e-paper is bent, and thus, senses the manipulation of bending the e-paper with both hands and leaving the e-paper bent. The e-paper controller 230 may control the e-paper to display a page selection menu 701 in response to the manipulation of bending the e-paper with both hands. The user may direct the e-paper to a desired page by inputting the desired page to the page selection menu 701.

Figure 8:
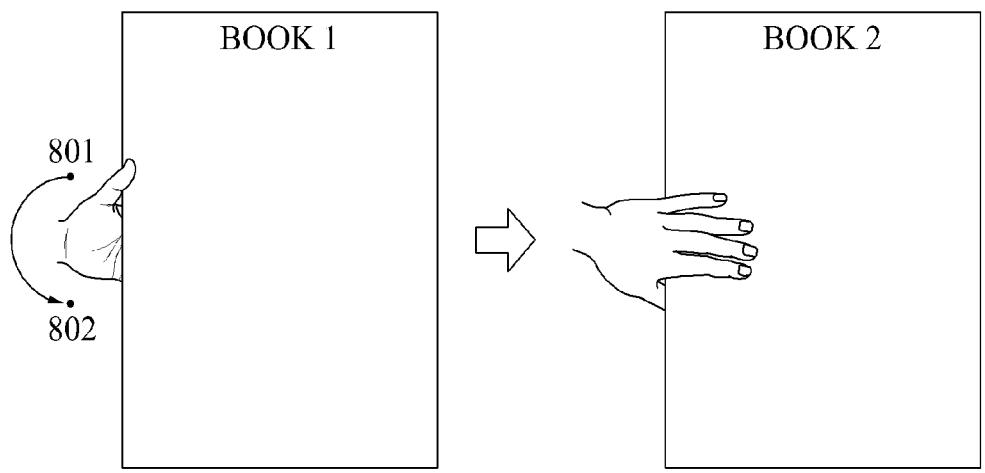
FIG. 8 is a diagram illustrating an example operation of rotating the e-paper.

FIG. 8 illustrates another example operation of manipulating e-paper. In the example shown in FIG. 8, a user manipulates the e-paper by turning the e-paper 100 over to view the back side 120 while viewing the front side 110 of the e-paper. However, unlike FIGS. 4 through 6, FIG. 8 illustrates an example of turning the e-paper over from direction 801 to direction 802. For example, the user manipulation sensor 220 may sense the manipulation of rotating the e-paper over. The e-paper controller 230 may control the e-paper to change contents displayed on the e-paper in response to the manipulation of turning the e-paper over.

In the example shown in FIG. 8, contents displayed on the e-paper are changed from Book 1 to Book 2. That is, the user may turn the e-paper over from the direction 801 to the direction 802, and thus, may view next contents with respect to the currently displayed contents. The e-paper controller 230 may control the e-paper to change the displayed contents from Book 1 to Book 2 in response to the user turning the e-paper from direction 801 to direction 802. Also, the e-paper controller 230 may control the e-paper 100 to change the displayed contents from Book 2 to Book 1 in response to a user turning the e-paper from direction 802 to direction 801.

Figure 9:
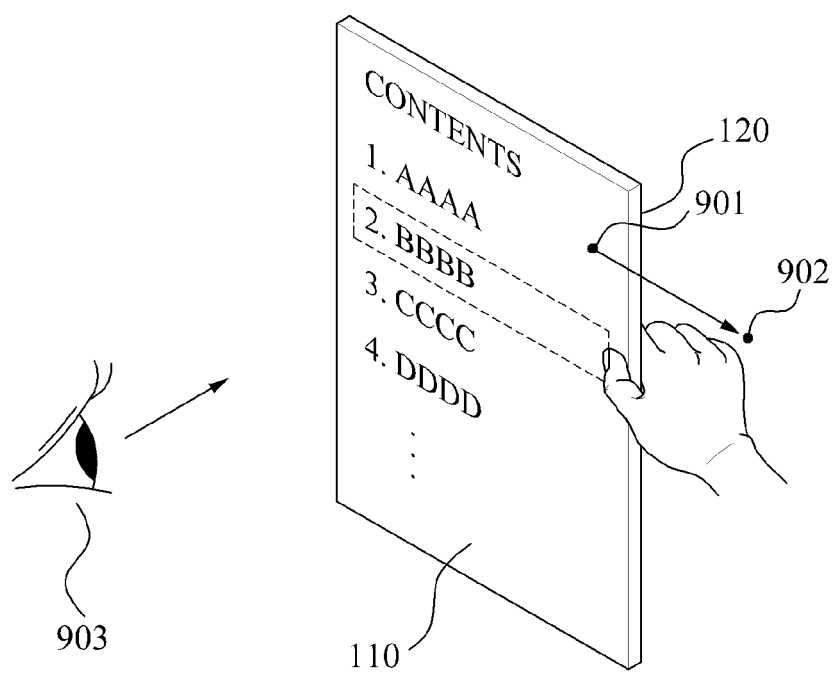
FIG. 9 is a diagram illustrating an example operation of a user selecting contents from among a list of contents.

FIG. 9 illustrates another example operation of manipulating e-paper. In the example shown in FIG. 9, a contents list is displayed on the front side 110 of the e-paper.

In this example, a user 903 manipulates the e-paper by touching at least one of the front side 110 and the back side 120 of the e-paper with a finger to select contents from among the contents list. The user 903 drags a finger from a direction 901 to a direction 902 by touching at least one of the front side 110 and the back side 120 of the e-paper. That is, the user 903 may select contents from among the contents list by performing an operation, for example, the operation may result in the user selecting a book from a plurality of books. The e-paper controller 230 may control the e-paper to display the selected contents or to store the selected contents in a memory, in response to the manipulation of the user.

When the e-paper is connected to a network, such as the Internet and the like, the user may select desired contents from a network-based contents provider, and the e-paper may be used as an interface for purchasing the selected contents. That is, the user may select a desired e-book by performing an operation using the user interface of the e-paper similar to the result of taking of a book from a bookshelf.

Figure 10:
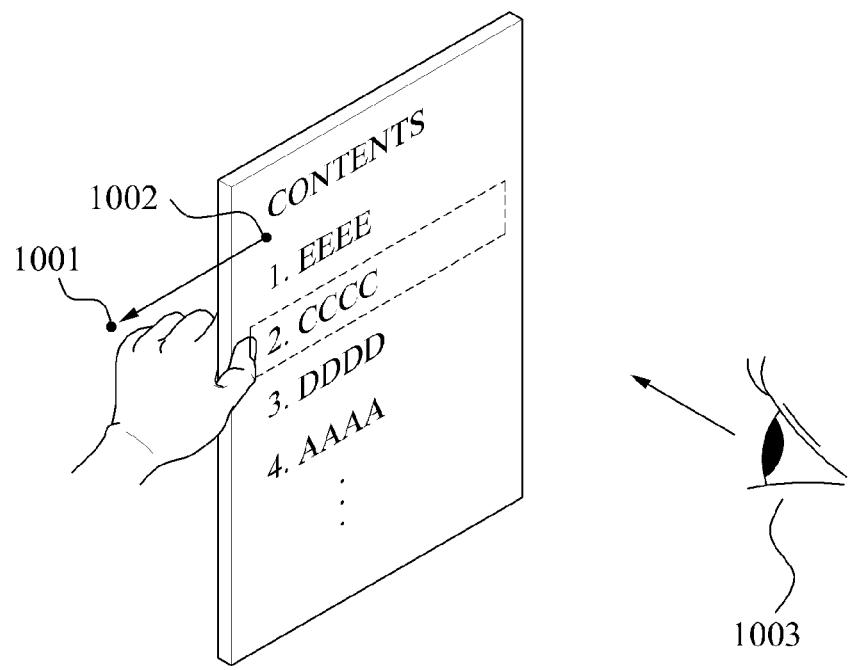
FIG. 10 is a diagram illustrating another example operation of a user selecting contents from among a list of contents.

FIG. 10 illustrates another example operation of manipulating e-paper. FIG. 10 illustrates a user manipulating the e-paper in a different direction with respect to the manipulation of FIG. 9. That is, a user 1003 drags a finger from direction 1002 to direction 1001 by touching at least one of the front side 110 and the back side 120 of the e-paper. In this example, the e-paper controller 230 may control the e-paper to remove the selected contents from the contents list, in response to the manipulation of the user.

Figure 11:
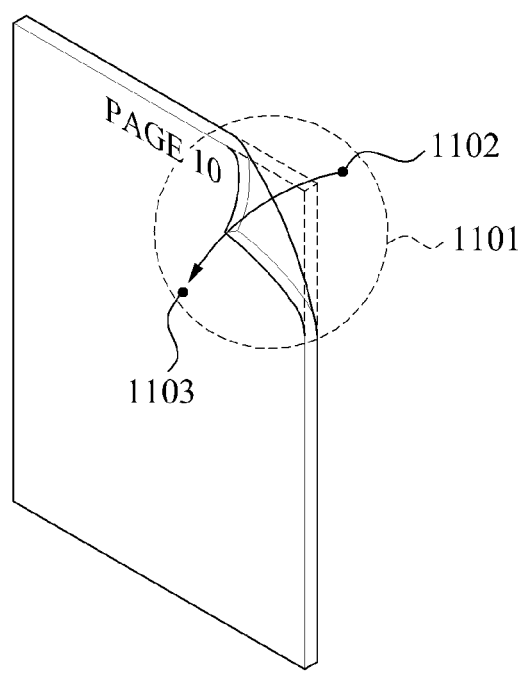
FIG. 11 is a diagram illustrating an example operation of a user bending the corner of an e-paper.

FIG. 11 illustrates another example operation of manipulating e-paper. In the example shown in FIG. 11, a user manipulates the e-paper by bending a corner 1101 of the e-paper. For example, the user manipulation sensor 220 may sense that the corner 1101 of the e-paper is bent, and thus, may sense the manipulation of the user. The degree of bending the corner 1101 may be different depending on the flexibility of the e-paper. For example, the user manipulation sensor 220 may be set to sense the manipulation of the user, when the corner 1101 is bent over a preset reference amount.

The e-paper controller 230, for example, may control the e-paper to set a bookmark on a page displayed on the e-paper, in response to the manipulation by the user of bending the corner 1101 of the e-paper. Accordingly, the user may set a bookmark on a desired page by bending the corner 1101 of the e-paper from direction 1102 to direction 1103.

According to various embodiments, the e-paper controller 230 may control the e-paper to display a page where the representative bookmark is set, when the user bends the corner 1101 of the e-paper from the direction 1103 to the direction 1102. In this example, the page where the representative bookmark is set may be a bookmark set automatically by an e-book. Also, the page where the representative bookmark is set may be a page manually set by the user.

Figure 12:
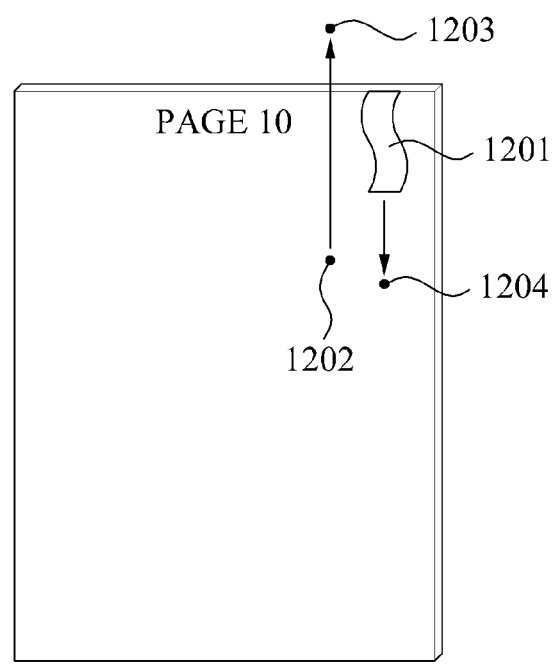
FIG. 12 is a diagram illustrating an example operation of an e-paper being bookmarked.

FIG. 12 illustrates another example operation of manipulating e-paper. FIG. 12 illustrates an example where a user marks contents by setting a plurality of bookmarks.

In the example shown in FIG. 12, a user may manipulate the e-paper by touching at least one of a front and a back of a corner of the e-paper, over the course of a preset time threshold. In this example, the e-paper controller 230 may control the e-paper to provide a bookmark setting menu, in response to the manipulation by the user of touching the at least one of the front and back of the corner of the e-paper during the preset amount of time. For example, the predefined time may be set to 1 second, 2 seconds, three seconds, or other desired amount of time. For example, the providing of the bookmark setting menu may display a message such as, "would you like to add a bookmark on the current page?" The e-paper may display the page where a bookmark 1201 is set, together with the bookmark 1201.

In FIG. 12, the manipulation of the user may be touching the bookmark 1201 displayed on the e-paper during the predefined time. In this example, the e-paper controller 230 may control the e-paper to provide a bookmark delete menu, in response to the manipulation by the user of touching the bookmark displayed on the e-paper. For example, the providing of the bookmark delete menu may display a message such as "would you like to delete the bookmark on the current page?"

In FIG. 12, the manipulation of the user may be touching the bookmark 1201 displayed on the e-paper and dragging the touch from a direction 1202 to a direction 1203. The e-paper controller 230 may control the e-paper to delete the bookmark 1201, in response to the manipulation of the user.

In FIG. 12, the manipulation of the user may be touching the bookmark 1201 displayed on the e-paper and dragging the touch to a direction 1204. In this example, the e-paper controller 230 may control the e-paper to provide a bookmark list, in response to the manipulation by the user of touching the bookmark 1201 and dragging the touch.

Figure 13:
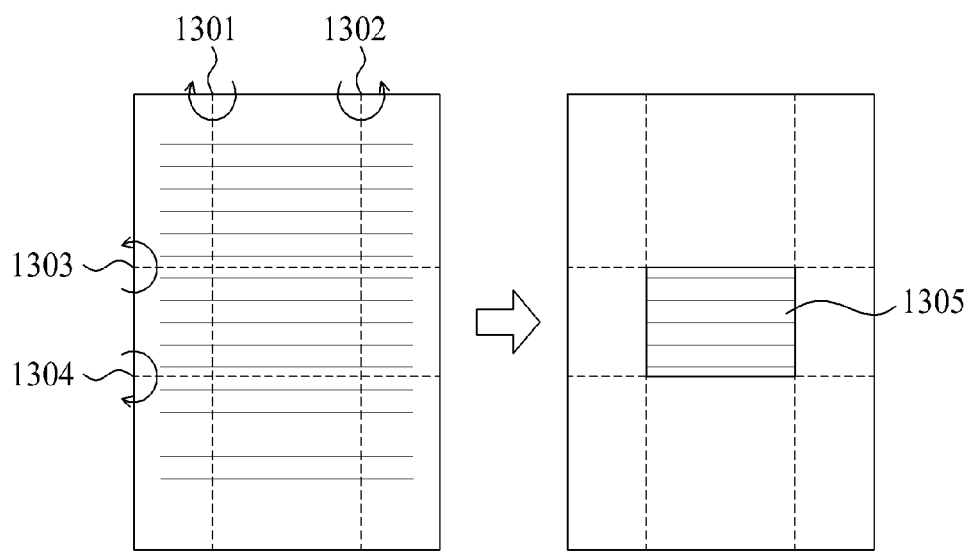
FIG. 13 is a diagram illustrating an example operation of an e-paper being folded at multiple areas.

FIG. 13 illustrates another example operation of manipulating e-paper. In the example shown in FIG. 13, a user may manipulate the e-paper by folding the e-paper. For example, the user may perform a manipulation of folding or bending at areas 1301, 1302, 1303, and 1304 of the e-paper to set a memo area 1305 in the e-paper. In this example, the e-paper controller 230 may control the e-paper to provide the memo area 1305, in response to the manipulation by the user of folding or bending the areas 1301, 1302, 1303, and 1304 of the e-paper.

Figure 14:
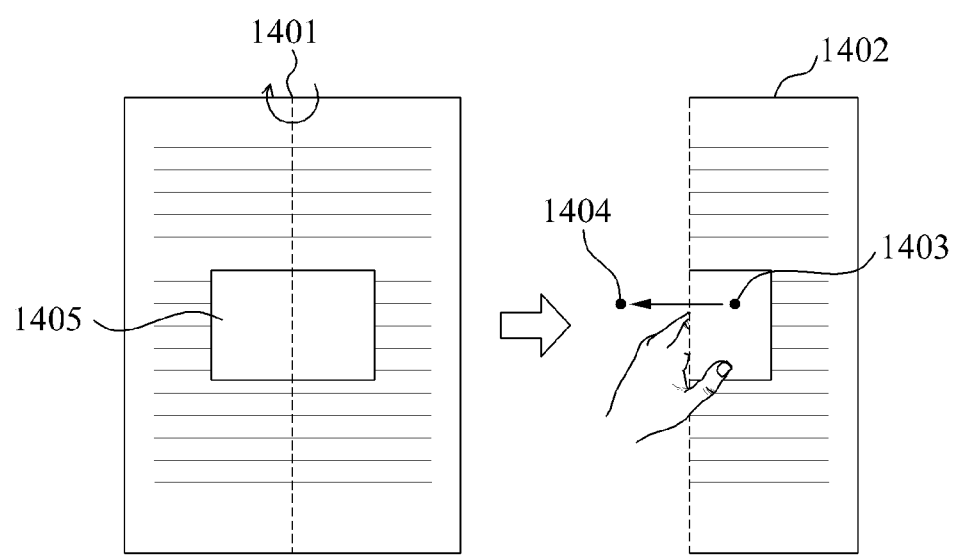
FIG. 14 is a diagram illustrating an example operation of a user touching both sides of an e-paper.

FIG. 14 illustrates another example operation of manipulating e-paper. In the example shown in FIG. 14, a user may manipulate the e-paper by touching both faces of an e-paper 1402 with a finger and dragging the finger. In this example, the drag is performed from a direction 1403 to a direction 1404. The e-paper controller 230 may control the e-paper 1402 to delete a memo 1405 displayed on the e-paper 1402, in response to the manipulation by the user of touching and dragging the finger.

The example methods described herein may be performed or controlled by a processor. The processor may perform an operation in the same manner as an operation performed by the e-paper controller 230.

Figure 15:
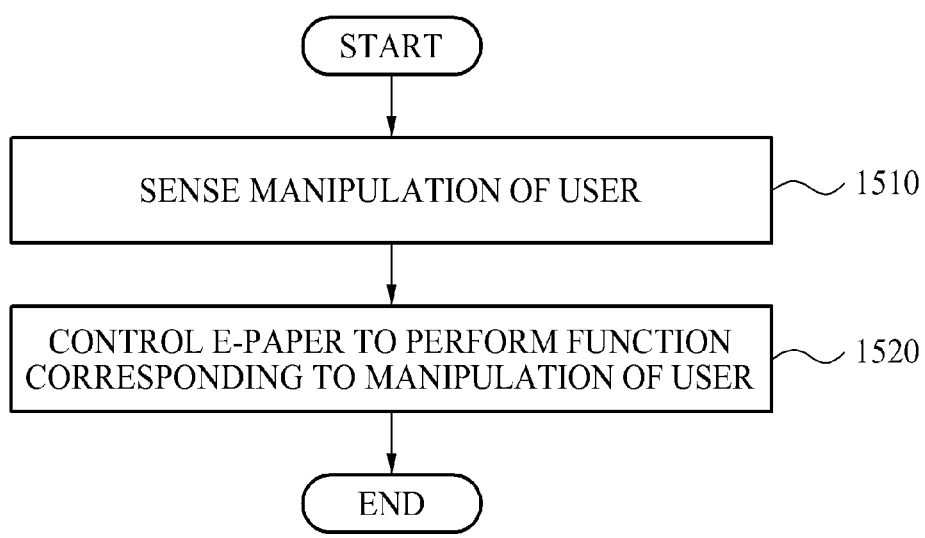
FIG. 15 is a flowchart illustrating an example of a method of controlling a user interface.

FIG. 15 illustrates an example of a method of controlling a user interface. In operation 1510, a user interface apparatus may sense a manipulation by a user on an e-paper.

In operation 1520, the user interface apparatus may control the e-paper to perform a function corresponding to the manipulation of the user. For example, the manipulation of the user may relate to a method of handling a paper or a book.

Figure 16:
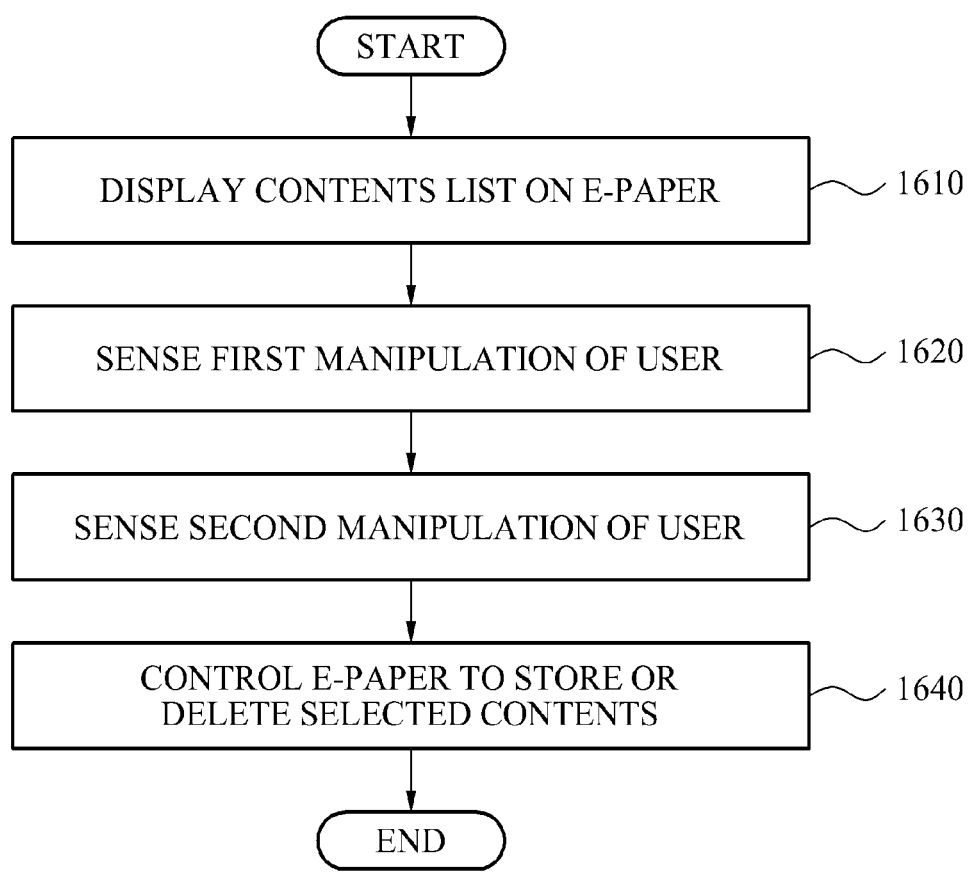
FIG. 16 is a flowchart illustrating another example of controlling a user interface.

FIG. 16 illustrates another example of a method of controlling a user interface. In operation 1610, a user interface apparatus may display a contents list on the e-paper.

In operation 1620, the user interface apparatus may sense a first user manipulation such as a touching of at least one of a front and a back of the e-paper to select contents from among the contents list.

In operation 1630, the user interface apparatus may sense a second user manipulation such as a dragging of a finger by touching at least one of the front and the back of the e-paper.

In operation 1640, the user interface apparatus may control the e-paper to store or delete the selected contents according to a drag direction of the finger touching the front and/or the back of the e-paper.

In response to user manipulation, the apparatus and methods described herein provide a user interface for e-paper. The user interface may be provided based on one or more user manipulations of the e-paper, for example, a bending, a turning, a folding, a drag event, an applied pressure, and the like. The user interface may sense the user manipulation with a user manipulation sensor. The user manipulation may correspond to a user handling an actual paper or a book, such as the turning of a page, the folding of a page, the marking of a page, and the like. The user interface may be provided based on gravity. The direction of gravity may be sensed by a gravity-directional sensing unit. For example, when the e-paper is turned over, the user interface can sense that gravity has changed and also change the current page being displayed on the e-paper.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of examples have been described above. Nevertheless, it is understood that various modifications may be made. For example, suitable results may be achieved if the described techniques are performed in a different order and/or if components in a to described system, architecture, device, or circuit are combined in a different manner and/or replaced or supplemented by other components or their equivalents. Accordingly, other implementations are within the scope of the following claims.

What is claimed is:

1. An electronic paper (e-paper) display apparatus comprising a user interface, the apparatus comprising:
   a flexible display configured to display an e-paper, through a front face and a back face of the flexible display;
   a touch interface, including a sensor, configured to receive a user input, wherein the user input corresponds to manipulating the e-paper displayed on the front face and the back face of the flexible display, the manipulation comprises any of: folding or bending of the flexible display, touching both faces of the folded or bent flexible display, and dragging a memo on the flexible display;

an e-paper controller, including a processor, configured to display the memo on the e-paper, in response to the user folding or bending the flexible display along a plurality of axes that bound a memo area on the e-paper, to delete the a memo displayed on the e-paper, in response to the user folding or bending of the flexible display along an axis that traverses the memo area, touching the memo on both sides of the axis and on one face of the e-paper, and then dragging the memo in a direction from a point on the flexible display to a point off of the flexible display.

2. The apparatus of claim 1, wherein the sensor comprises:
a touch sensor configured to sense a touch on the touch interface;
a pressure sensor configured to sense a pressure applied to the e-paper; and
a gravity-directional sensor configured to sense a change in a gravity direction of the e-paper.

3. The apparatus of claim 1, wherein:
the manipulation by the user comprises the user turning over the flexible display; and
the e-paper controller is further configured to control the e-paper to change a page displayed on the flexible display, in response to the manipulation.

4. The apparatus of claim 1, wherein:
the manipulation by the user comprises the user bending the flexible display and leaving the flexible display bent; and
the e-paper controller is further configured to control the e-paper to display a page selection menu on the flexible display, in response to the manipulation.

5. The apparatus of claim 1, wherein:
the flexible display is configured to display a list;
the manipulation by the user comprises the user touching at least one of a front face and back face of the flexible display with a finger, to select an element from among the list, and the user dragging the finger while touching at least one of the front face and back face of the flexible display; and
the e-paper controller is further configured to control the e-paper to store or delete the selected element in the list depending on a drag direction of the finger, in response to the manipulation.

6. The apparatus of claim 1, wherein the manipulation by the user comprises bending a corner of the flexible display; and
the e-paper controller is further configured to control the e-paper to set a bookmark on a page displayed on the flexible display, in response to the manipulation.

7. The apparatus of claim 1, wherein:
the manipulation by the user comprises bending a corner of the flexible display; and
the e-paper controller is further configured to control the e-paper to move to a page where a bookmark is set, in response to the manipulation.

8. The apparatus of claim 1, wherein:
the manipulation by the user comprises touching at least one of a front face and a back face of a corner of the flexible display, over the course of a preset time threshold; and
the e-paper controller is further configured to control the e-paper to display a bookmark setting menu on the flexible display, in response to the manipulation.

9. The apparatus of claim 1, wherein:
the manipulation by the user comprises touching a bookmark displayed on the flexible display; and
the e-paper controller is further configured to control the e-paper to display a bookmark delete menu on the flexible display, in response to the manipulation.

10. The apparatus of claim 1, wherein
the manipulation by the user comprises dragging a bookmark displayed on the flexible display; and
the e-paper controller is further configured to control the e-paper to display a bookmark list on the flexible display, in response to the manipulation.

11. The apparatus of claim 1, wherein the e-paper is configured to display the list on the first face of the flexible display of the e-paper, and the touch interface is configured to receive user input through the back face of the flexible display.

12. A method of controlling an electronic paper (e-paper) based on user manipulation, the method comprising:
receiving user input through a touch interface of a flexible display of the e-paper, the touch interface including a sensor, wherein the user input corresponds to manipulating the e-paper displayed on the front face and the back face of the flexible display, and the manipulation comprising any of folding or bending the flexible display, simultaneously touching both faces of the folded or bent flexible display, and dragging a memo on the flexible display;
controlling the e-paper, by use of a processor,
to display the memo on the e-paper, in response to the user folding or bending the flexible display along a plurality of axes that bound a memo area on the e-paper, and
to delete the memo displayed on the e-paper, in response to the user folding or bending of the flexible display along an axis that traverses the memo area, touching the memo on both sides of the axis and on one face of the e-paper, and then dragging the memo in a direction from a point on the flexible display to a point off of the flexible display.

13. The method of claim 12, wherein:
the sensed manipulation by the user comprises turning over the flexible display; and
the processor controls the e-paper to change a page displayed on the flexible display, in response to the manipulation.

14. The method of claim 12, wherein
the sensed manipulation by the user comprises turning over the flexible display; and
the processor controls the e-paper to change contents displayed on the flexible display, in response to the manipulation.

15. The method of claim 12, wherein
the sensed manipulation by the user comprises bending the flexible display and leaving the flexible display bent; and
the processor controls the e-paper to display a page selection menu on the flexible display, in response to the manipulation.

16. The method of claim 12, wherein
the sensed manipulation by the user comprises touching at least one of a front face and back face of a corner of the flexible display, over the course of a preset time threshold; and
the processor controls the e-paper to display a bookmark setting menu on the flexible display, in response to the manipulation.

17. A method of an electronic paper (e-paper) being manipulated by a user, the method comprising:
- displaying a list on a flexible display of the e-paper;
- sensing, by use of a sensor, a first manipulation by the user through the flexible display of the e-paper, the first manipulation comprising the user simultaneously touching both a front face and a back face of the flexible display of the e-paper, thereby selecting elements being displayed from among the list;
- sensing, by use of a sensor, a second manipulation by the user through the flexible display of the e-paper, the second manipulation comprising the user simultaneously touching and dragging both the front face and the back face of the flexible display of the e-paper, thereby dragging the selected elements; and
- controlling the e-paper, by use of a processor,
  - to display a memo on the e-paper, in response to the user folding or bending the flexible display along a plurality of axes that bound a memo area on the e-paper, and
  - to delete the memo displayed on the e-paper, in response to the user folding or bending of the flexible display along an axis that traverses the memo area, touching the memo on both sides of the axis and on one face of the e-paper, and then dragging the memo in a direction from a point on the flexible display to a point off of the flexible display.

\* \* \* \* \*